Nov. 25, 1930. P. PASCHEN ET AL 1,783,000
APPARATUS FOR INDICATING SPEED VARIATIONS
Filed March 27, 1930 3 Sheets-Sheet 1

Inventors
Paul Paschen, +
Wilhelm Gebhardt
by Knight Bros
Attorneys

Patented Nov. 25, 1930

1,783,000

UNITED STATES PATENT OFFICE

PAUL PASCHEN AND WILHELM GEBHARDT, OF NUREMBERG, GERMANY, ASSIGNORS TO SIEMENS-SCHUCKERTWERKE AKTIENGESELLSCHAFT, OF BERLIN-SIEMENSSTADT, GERMANY, A CORPORATION OF GERMANY

APPARATUS FOR INDICATING SPEED VARIATIONS

Application filed March 27, 1930, Serial No. 439,402, and in Germany April 23, 1929.

Our invention relates to improvements in apparatus for indicating speed variations, more particularly variations in the traveling speed of motor cars, to cars following behind.

The object of our improved apparatus is as follows: It should as quickly as possible indicate accelerations and retardations but, on the other hand, be equipped with such a sluggish indicating device that indications of speed changes remain noticeable for some time afterwards. This latter for the reason that the following car should not be obliged to observe constantly the indicator of the car traveling in front. The indicating device must, furthermore, not be affected when the car climbs a hill, descends into a valley or negotiates a curve, it must be simple, cheap and reliable and still be easily visible from a car traveling sideways behind the car with the indicator.

The indicating device according to our invention consists substantially of communicating vessels the connecting member or yoke of which is located substantially in the direction of the longitudinal axis of the vehicle and a liquid which at least fills the rising tubes completely or partly and the level of which in the rising tubes is visible from a distance.

By giving the rising tubes special cross-section ratios, by providing non-return valves or balancing capillary tubes, the indicating device is given such a characteristic that small displacements of the liquid such as occur when the car is climbing or descending a hill or negotiating a curve have practically no or at least only a negligible effect upon the indicating device.

Preferably the rising tubes connected to the yoke member of the communicating vessels are located in a plane at least substantially vertical to the longitudinal axis of the car, preferably close together side by side. One rising tube then serves for indicating the retardation and the other for indicating the acceleration. It is, however, then necessary that in the yoke or connecting member there should be provided a propelling substance of other density than that of the indicating liquid which compels a directional force, preferably the own weight, to take up a certain central position within the yoke member. This construction of the rising tubes enables the level of the liquid to be made visible from a considerable distance, and the indicating device to be unaffected by inertia and centrifugal forces when negotiating curves.

If the differences in cross-sections between the rising tube and the yoke member are comparatively great, a temperature variation causes a comparatively great fluctuation of the level in the rising tube, as in the case of thermometers. These fluctuations are undesirable because they disturb the correct balancing of the indicating device. According to a further modification of our invention these fluctuations are eliminated by the communicating vessel being through a throttling member connected with an expansion vessel of a cross-sectional area large at the height and in the direction of the level of the liquid. Under large is here to be understood that the cross-sectional area of the expansion vessel is large in comparison with the cross-sections of the rising tubes. The ratio of the cross-sections depends upon the temperature coefficient of the indicating liquid.

Since this expansion vessel is able to hold a comparatively large quantity of liquid without a rise of the level of the liquid worth mentioning, in the ratio of the cross-sections more than the rising tubes, temperature fluctuations cause very minute fluctuations in level only.

Embodiments of our invention are by way of example illustrated in the drawings affixed to our specification.

Figure 1:
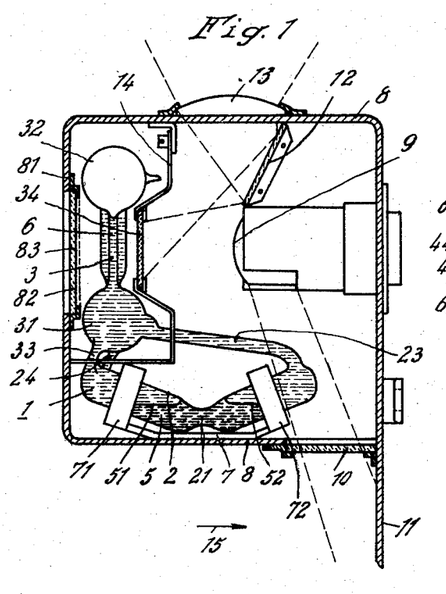
Fig. 1, shows a side-elevation of our improved indicating apparatus.
Figure 2:
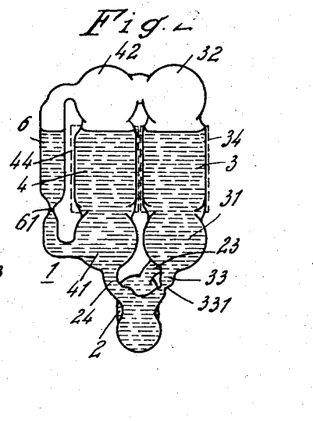
Fig. 2, the indicating apparatus according to Fig. 1 viewed in the direction of the arrow 15.

Referring to Figs. 1 and 2 of the drawings, 1 is a glass vessel which substantially consists of the yoke member 2 at least approximately parallel to the longitudinal axis of the car and the two rising pipes 3 and 4 flattened transversely to the longitudinal axis of the car which by means of the tubes 23 and 24 are in communication with the ends of the yoke member 2. The two rising tubes are directly side by side located in a plane at right angles to the longitudinal axis of the car and above and below the flat portions expanded into bulbs. The vessel is filled with a liquid for instance opaque creosote or toluene. The yoke member 2 is curved downwards and contains a mass of mercury 5 interposed between the columns of the indicating liquid. With a view to bring about a damping and valve action the yoke member 2 is contracted at 21. The impulses caused by vibrations of the travelling car are absorbed by damped oscillations of the broad surface 51, 52 of the mass of mercury 5 and do not bring about a displacement of the indicating liquid. Our indicating apparatus is unaffected by climbing hills or descending into valleys because the two rising tubes 3, 4 are always located side by side at the same height and the slow, minute displacement of the mercury 5 due to the inclination of the glass vessel causes in the curved yoke member 2 no permanent displacement worth mentioning of the columns of liquid in the rising tubes. In order to remove these displacements completely, however, there is connected to one end of the yoke member 2 and to the lower bulb-shaped extension 31 of the rising tube 3 the equalizer tube 33.

In order that the fluctuations of the liquid caused by the retardation or acceleration of the car should not be able to equalize themselves through the tube 33, this tube is provided with a capillary contraction at 331. To eliminate the fluctuations of the levels caused in the rising tubes by temperature changes there is connected to the lower bulb-shaped extension 41 of the rising tube 4 the expansion vessel 6 the cross-section of which at the height and direction of the level of the liquid is large in comparison to the cross-sections of the rising tubes 3, 4. The ratio of the cross-sections depends upon the temperature coefficient of the indicating liquid. Since this expansion vessel is able to take up a comparatively large quantity of liquid without a rising of the level of the liquid worth mentioning, viz in proportion to the cross-sections more than the rising pipes, the temperature fluctuations cause only a very minute fluctuation of the levels. In order to avoid that the liquid in the temperature equalizing vessel 6 participate in the fluctuations of the levels caused by the variations in the speed, the connecting member between the rising pipe 4 and the expansion vessel 6 is provided with capillary contraction at 61. The bulb-shaped extensions 32, 42 of the rising tubes 3 and 4 and the expansion vessel 6 are in communication with one another.

The vessel 1 is secured in the box 8 by means of the holder 7. The clips or straps 71, 72 of the holder embrace the yoke 2, a plastic and subsequently hardening substance being interposed between the clips and the yoke. A lamp 9 shaded towards the top serves for the illumination of the indicating device. To enable this lamp to be simultaneously used for lighting the number plate a window 10 is provided in the bottom of the box through which light from the lamp 9 is thrown onto the number plate. Since this lamp should only be switched on and off together with the headlights of the motor car and these lights must not burn during the day to save current, a reflector 12 is provided for day lighting which deflects the daylight entering through an opening in the top of the box provided with a collecting lens 13 towards the indicating device. In the path of the rays of light passing through the flattened portion of the indicator tubes 3, 4 there are placed light filters 34, 44 of different colors which are framed in the sheet iron 14. Preferably a red filter 44 is located in front of the rising tube 4 indicating the retardation and in front of the rising tube 3 indicating the acceleration a green filter 34. The wall 81 of the box 8 is in front of the indicating tubes provided with a window of frosted glass 82. For the purpose of obtaining a greater spread of the rays of light a translucent texture 83 (such as gauze or wire netting) is interposed between the indicating tubes and the frosted window. All the parts of the vessel not directly required for the indications are rendered opaque, for instance by applying a coating of dark lacquer.

The apparatus functions in the following manner: Assuming the car is travelling in the direction of the arrow 15. As long as the car stops or proceeds at a uniform rate of speed the liquid stands at the same level in both rising tubes, the window 82 is dark. If the car is now accelerated the mercury in the yoke member 2 does not instantaneously participate in the acceleration, the mercury lags behind, pushes the column of liquid located in front of itself up in the rising tube 4 and draws the column of liquid behind itself down in the rising tube 3. The level of the liquid in the rising tube 4 rises and that in the rising tube 3 drops. The window with the green light filter is consequently uncovered for the passage of the rays of light, the indicating device shows a green light. This shows the driver of the car following behind that he may also increase his speed. If, on the other hand, the speed of the vehicle is retarded, the mercury moves in the direction of the arrow 15, pushes the column of liquid up in the rising tube 3 and draws the column of liquid down in the rising pipe 4. The red window is thus uncovered for the passage of the rays of light, and the driver of the car following receives the signal to slow down to prevent his crashing into the car in front.

The bulb-shaped enlargement above the flattened portion of the rising tube has the effect that the difference in the levels of the rising tubes caused by the displacement of the liquid becomes operative mainly by a lowering of the indicating liquid in the rising tube to be uncovered since the displacement of the liquid causes no appreciable rise of the level in the bulb-shaped enlargements.

In order to avoid with certainty that the temperature compensating vessel participates in the short-period fluctuations of the indicating liquid, the compensating vessel may also be connected at a dynamically neutral point of the communicating vessels. This point is located at a place of the vessel at which the acceleration and retardation causes no pressure difference. The connection between the expansion vessel and the enlarged parts of the two rising pipes as well as their connection with each other is, furthermore, superfluous if the vessel is evacuated.

Figure 3:
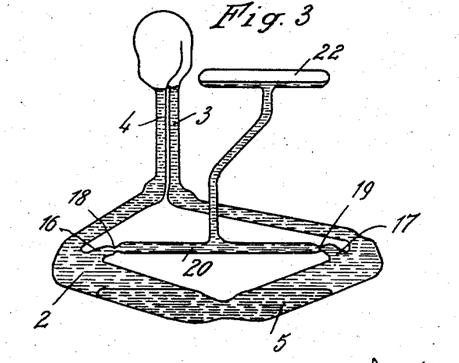
Figs. 3, 4, 5 and 6, are modifications of the indicating apparatus.

If there exists no neutral connecting point for the expansion vessel such a point may be produced artificially by connecting points of equal pressure increase and reduction by a tube, as shown in Fig. 3 of the drawings, with interposed capillary contractions. In this figure, as in Figs. 1 and 2, the two rising tubes are located closely side by side, and the drive of the indicating liquid is again effected by the mass of mercury 5. To the points 16, 17 in front and behind the mercury is connected the equalizing tube 20 through the capillary contractions 18 and 19 and to this tube is connected the expansion vessel 22.

Figures 4, 5:
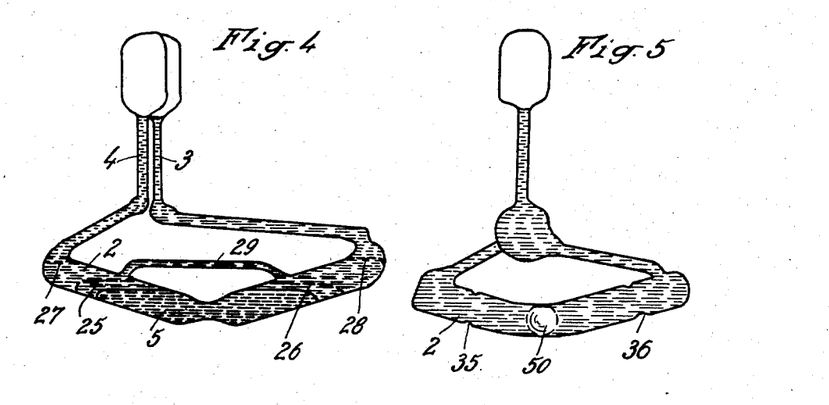

In Fig. 4 of the drawings there is illustrated a communicating vessel without temperature compensating vessel in which the tube for equalizing the displacements of the liquid caused by climbing hills, descending into valleys and negotiating curves is so connected that the mercury closes the mouths of the equalizing tubes in case of retardations or accelerations.

Referring to this figure 5 is again the mass of mercury. 25 and 26 are the small displacements caused by gradients or curves. 27 and 28 are the large displacements occurring in case of retardations or accelerations. In order that the small displacements 25 and 26 should not cause fluctuations of the liquid in the rising tubes 3, 4, the equalizing tube 29 is connected to the yoke member 2 at points outside, but in closest proximity to the tolerance range 25, 26. Within the tolerance range the displacement of the liquid is equalized by this tube. In the event of larger deflections of the mercury 5, on the other hand, the capillary mouths of the equalizing tube are closed by the mercury. The entire displacement of the liquid is thus utilized for raising and lowering the level of the liquid in the rising tubes 3 and 4.

In the embodiment of our invention illustrated in Fig. 5 of the drawing the yoke member 2 contains instead of the mercury a ball 50 constructed of a denser substance than the indicating liquid. The ball fills up substantially the entire inner cross-section of the yoke member. For the purpose of limiting the path of the ball and braking the movement of the liquid the yoke member is contracted in proximity to both ends at 35 and 36.

In the embodiment illustrated the ball 50 is employed as driving means. It will be understood, however, that two or more of such balls may be employed. Particularly favorable is the employment of two balls since on account of the mutual friction of the balls the balls return into the central position after a certain delay only, and the columns of liquid in the rising tubes thus remain in the state of disturbed equilibrium for some time even after the retardation or acceleration has stopped. The indicating apparatus does therefore not give a perfunctory flash when the retardation or acceleration is momentary only, but displays the red or green light for some time. This is particularly advantageous because the driver of the car following cannot be expected to keep his eye on the car ahead all the time in order not to miss the momentary flash up of red or green light. A certain amount of sluggishness in our improved indicating device is in particular obtained by the ball itself and the contractions 35 and 36 braking the motion of the liquid. In the embodiment illustrated in this figure gravity acts as directing force on the ball 50 and tends to return the ball 50 always into the central position on account of the curvature of the tube 2.

It will be understood, however, that other directing forces may be employed, such as weak helical springs housed in the tube 2, or a magnet located external to the tube, provided the ball 50 consists of magnetic material.

Figure 6:
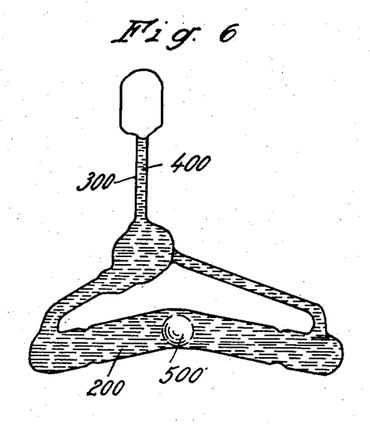

In the embodiment of our invention illustrated in Fig. 6 of the drawings the substance of the ball 500 is specifically lighter than the indicating liquid. The ball consists here of vulcanite, the indicating liquid of mercury. The yoke or connecting member 200 is here curved upwards in contrast with the design shown in Fig. 5. The rising tube 400 located behind the red window is here, in contrast with Fig. 6, connected to the end of the yoke member 200 located in front viewed in the direction of travel, arrow 15, and the rising tube 300 behind the green window to the rear end of the yoke member. Otherwise both modifications of the apparatus are alike.

Figure 7:
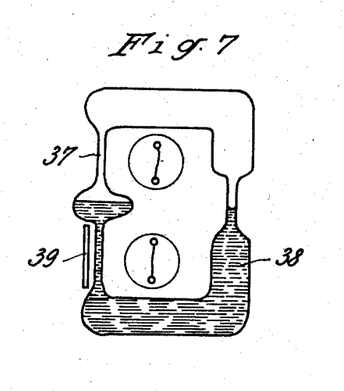
Fig. 7, is a vessel in which the rising and falling of the liquid in a rising tube can be employed for indicating the acceleration as well as the retardation.

In Fig. 7 of the drawings there is illustrated a vessel in which the two rising tubes are located in a plane situated in the longitudinal axis of the car. In this arrangement the driving mass in the yoke becomes superfluous. The rise and fall of the indicating liquid in the same rising tube 37 is here employed for indicating the acceleration as well as the retardation. The rising tube 38 serves for balancing only. In the vicinity of the normal level the cross-sectional area of the indicating tube 37 is larger, the cross-sectional area of the balancing tube 38 smaller than the other places. In order that the device may indicate the acceleration and the retardation, the indicating rising tube 37 is contracted from the normal level upwards and downwards and likewise the balancing tube 38 enlarged upwards and downwards.

The vessel is, for example, filled with a green-colored transparent liquid. In front of the lower half of the indicating rising tube 37 is located the red window 39. The red color of the window and the green color of the liquid are complementary. In the position shown white light appears at the upper half of the tube 37, and the lower half of the tube is dark because the two complementary light filters one placed behind the other permit no light to pass. In the event of a retardation, that is when the lower half of the tube has become free from the liquid, red light appears since now one filter only is located in the path of the beam of light. In the upper half the light is white. In the event of an acceleration, that is when the liquid rises into the upper half, the lower half is not illuminated and in the upper half appears green light.

If the vessel is filled with mercury conditions may be retained unchanged for the lower half of the indicating rising tube. For the upper half of the vessel the rising mercury is utilized as mirror coating for the reflection. Into the path of the reflected rays of light is placed a green window. In order that this window should remain dark when the upper half contains no mercury, a black body is placed into the path of the light rays from the source of light behind the upper vessel, which body absorbs the light.

If separate vessels with communicating members are used for indicating the retardation and the acceleration, it is still easier to make the apparatus almost independent of small displacements of the liquid as they develop when the car is climbing up or running down a hill or negotiating a curve. If in motor cars it is, for instance, only necessary to indicate the retardation, one vessel may be omitted altogether and a particularly simple, easily adjustable and inexpensive indicating device is then obtained.

Figures 8, 9:
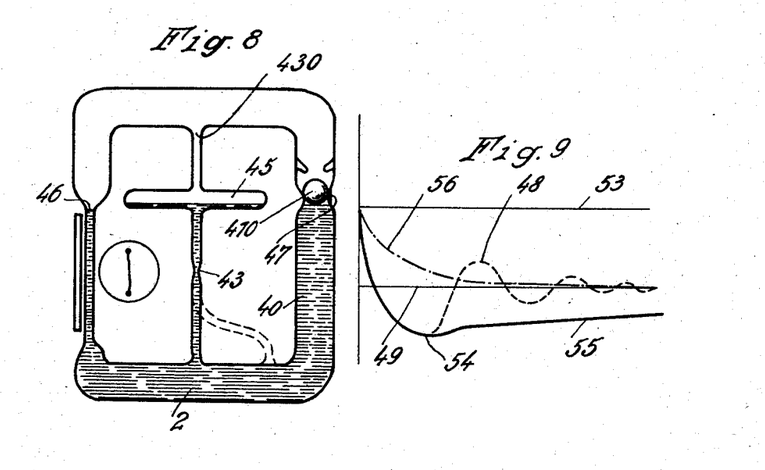
Fig. 8, shows a vessel with non-return valve which indicates the retardation only.
Fig. 9, represents the characteristic curve of the vessel according to Fig. 8, Fig. 10, shows a retardation indicator without a non-return valve, and Fig. 11, its characteristic curve.

In case of small vessel cross-sections the damping of the liquid is, as a rule, so great that only aperiodic speed changes develop. If, however, as shown in Fig. 8, a non-return valve is made use of the damping of the liquid is preferably made so small that per se periodically damped oscillations would be possible provided the non-return valve were omitted and if the liquid were caught in the position of greatest amplitude of the oscillations and detained by the non-return valve. The difference in the levels in the rising tubes then gradually disappears and equilibrium is set up by a throttling gap which the non-return valve leaves open even when it is in its closed position. In this way are obtained great deflections which are visible for a considerable time even after the acceleration or retardation of the car has come to an end. This is of particular advantage because the driver of the car following need not watch the indicator of the car ahead all the time.

In Fig. 8 of the drawings the ball-type non-return valve 410 is provided in the equalizing tube 40 which in the closed position still leaves the throttle gap 47. To prevent the formation of a meniscus or foam in the non-return valve, this valve may also be located within the liquid. The non-return valve damps directly the small displacements of liquid which would occur when climbing or descending a hill or passing through curves. The device or apparatus is thus practically unaffected by such small impulses.

For the already mentioned reasons there is provided at the yoke member 2 above the capillary contraction 43 the expansion vessel 45 of a cross-section large at the height and direction of the level of the liquid 46. Apart from this it is also at 430 connected with the part of the vessel free from liquid. The compensating vessel might also, for the reasons stated before, be connected to a point of the yoke member at which the acceleration or retardation causes no difference in pressure, that is in case of equal cross-sectional areas of the rising tubes at the centre, in case of unequal cross-sectional areas in the ratio of the two cross-sectional areas nearer to the rising tube with the larger diameter.

The cross-sectional area of the entire vessel is so large that the level of the liquid 46 would in the event of a sudden retardation of the car oscillate periodically according to the curve 48 shown in Fig. 9, around the position of equilibrium indicated by the straight line 49 corresponding with the retardation, if the non-return valve 410 were non-existent. The straight line 53 indicates the position of the normal level. The positions of the level are plotted as ordinates in dependence of the time as abscissæ. The liquid is, however, caught in the position of the greatest deflection, that is at 54, by the non-return valve 410. The difference in the levels can only equalize itself slowly through the throttling gap 47 according to the curve 55.

In this way a substantially greater deflection is obtained than when the indicating device would operate periodically according to curve 56. The deflection is also maintained for a longer time when the retardation disappears again, which is not indicated in Fig. 9, and the level of the liquid flows back again towards the straight line 53.

Figures 10, 11:
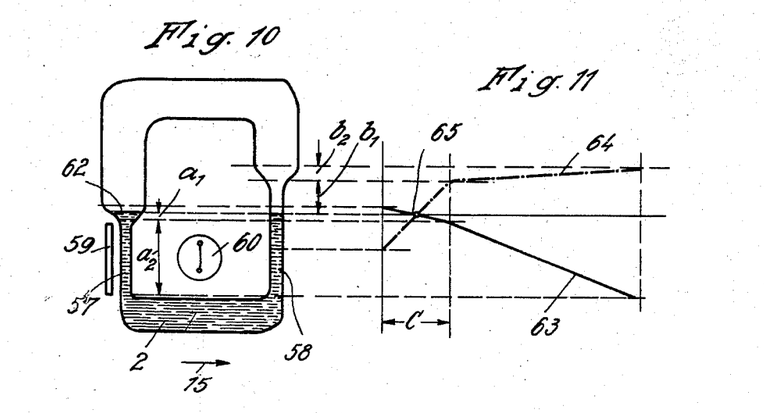

In Fig. 10 there is shown a still simpler construction of a retardation indicator.

The arrow 15 indicates the direction of travel of the car. To the yoke 2 of the communicating vessel are connected the indicating rising tube 57 and the equalizing tube 58. The vessel is filled with an opaque liquid. The indicating rising tube 57 is located in the path of the rays from the source of light 60 issuing through the, for instance, red window 59. The cross-sectional area of the indicating rising tube is greater in proximity to the normal level 62, the cross-sectional area of the equalizing rising tube 58 is smaller in the vicinity of the normal level.

In Fig. 11 of the drawings the level of the liquid of the indicating rising tube 57 is shown by the solid curve 63, the level of the liquid of the equalizing rising tube 58 by the broken line 64 as ordinate in dependence of the displacement volume as abscissa. The point 65 corresponds with the normal level, the range $c$ the small displacements of the liquid in the case of climbing or descending a hill or negotiating a curve which should have no effect upon the indicating device. Within the range $c$ the level of the liquid of the indicating rising tube remains approximately equal while that of the equalizing rising tube fluctuates very strongly. $a_1$ is the small change of level in the indicating rising tube, $b_1$ the large change of level in the equalizing rising tube. The conditions are reversed in the case of large displacements of liquid such as are produced by braking the car. Here the entire change of level is taken up by the indicating rising tube, distance $a_2$, and only a minute fluctuation, distance $b_2$, develops in the equalizing rising tube. The liquid in the tube 57 drops and allows the rays of the source of light 60 to pass through the window 59. By the flaring-up red light the attention of the driver of the car following is called to the fact that the car in front is slowing down. In order to obtain a larger passage area for the rays of light the lower portion of the indicating rising tube 57 is flattened out transversely to the direction of travel 15. Its cross-sectional area is in this part larger than the small, but smaller than the large cross-sectional area of the equalizing rising tube 58.

It will be readily understood that structural alterations may be made in the apparatus without departing from the spirit of our invention or the scope of the appended claims.

We claim as our invention:

1. In a device for indicating speed variations of traveling vehicles, more particularly motor cars, communicating vessels comprising a yoke member located substantially in the direction of the longitudinal axis of the vehicle, rising tubes connected to said yoke member, an indicating liquid within said rising tubes, and means adapted to render the level of said indicating liquid in said rising tubes visible from a distance.

2. In a device for indicating speed variations of traveling vehicles, more particularly motor cars, communicating vessels comprising a yoke member located substantially in the direction of the longitudinal axis of the vehicle, rising tubes connected to said yoke member and located substantially in a vertical plane at right angles to the longitudinal axis of the vehicle, an indicating liquid in the said rising tubes, a propelling mass in said yoke member tending to take up a definite central position, and means adapted to render the level of said indicating liquid in said rising tubes visible from a distance.

3. In a device for indicating speed variations of traveling vehicles, more particularly motor cars, communicating vessels comprising a yoke member located substantially in the direction of the longitudinal axis of the vehicle, the central portion of said yoke member in the operative position located lower than its ends, rising tubes connected to this yoke member and located in a vertical plane substantially at right angles to the longitudinal axis of said vehicle, an indicating liquid in said rising tubes, a propelling substance in said yoke member of greater density than said indicating liquid, and means adapted to render the level of said indicating liquid in said rising tubes visible from a distance.

4. In a device for indicating speed variations of traveling vehicles, more particularly motor cars, communicating vessels comprising a yoke member located substantially in the direction of the longitudinal axis of the vehicle, rising tubes connected to said yoke member and located substantially in a vertical plane at right angles to the longitudinal axis of the vehicle closely side by side, an indicating liquid in said rising tubes, a liquid of different density than that of the said indicating liquid in the said yoke member tending to take up a definite central position, and means adapted to render the level of said indicating liquid in said rising tubes visible from a distance.

5. In a device for indicating speed variations of traveling vehicles, more particularly motor cars, communicating vessels comprising a yoke member located substantially in the direction of the longitudinal axis of the vehicle, the central portion of said yoke member contracted and in the operative position located lower than its ends, rising tubes connected to the ends of said yoke member and located in a vertical plane substantially at right angles to the longitudinal axis of the vehicle, an indicating liquid in said rising tubes, a propelling liquid in the central portion of said yoke members and of greater density than said indicating liquid, and means adapted to render the level of said indicating liquid in said rising tubes visible from a distance.

6. In a device for indicating speed variations of traveling vehicles, more particularly motor cars, communicating vessels comprising a yoke member located substantially in the direction of the longitudinal axis of the vehicle, the central portion of said yoke member contracted and in the operative position located lower than its ends, rising tubes connected to the ends of said yoke member and located in a vertical plane substantially at right angles to the longitudinal axis of the vehicle, an indicating liquid in said rising tubes, mercury in the central portion of said yoke member, and means adapted to render the level of said indicating liquid in said rising tubes visible from a distance.

7. In a device for indicating speed variations of traveling vehicles, more particularly motor cars, communicating vessels comprising a yoke member located substantially in the direction of the longitudinal axis of the vehicle, rising tubes connected to the ends of said yoke member and located in a vertical plane substantially at right angles to the longitudinal axis of the vehicle, an equalizer tube interposed between the ends of the said yoke member comprising at least one capillary contraction, an indicating liquid in the said rising tubes, a propelling mass in said yoke member tending to take up a definite central position, and means adapted to render the level of said indicating liquid in said rising tubes visible from a distance.

8. In a device for indicating speed variations of traveling vehicles, more particularly motor cars, communicating vessels comprising a yoke member located substantially in the direction of the longitudinal axis of the vehicle, rising tubes connected to the ends of said yoke member, an indicating liquid in said rising tubes, at least one equalizing vessel connected to a part of the said communicating vessels filled with the indicating liquid, at least one capillary contraction in the connecting tube between the two said vessels, the cross-section of the equalizing vessel being at least at the height of the normal level of the liquid considerably larger than the cross-sectional area of the said rising tubes, and means adapted to render the level of said indicating liquid in said rising tubes visible from a distance.

9. In a device for indicating speed variations of traveling vehicles, more particularly motor cars, communicating vessels comprising a yoke member located substantially in the direction of the longitudinal axis of the vehicle, rising tubes connected to the ends of said yoke member and located in a plane substantially at right angles to the longitudinal axis of the vehicle, an indicating liquid in said rising tubes and in the ends of said yoke member, a propelling liquid of different density than the indicating liquid filling up the central part of said yoke member tending to take up a definite central position, an equalizing tube connecting the ends of said yoke member, an equalizing vessel connected to a part of said communicating vessels filled up by the indicating liquid, capillary contractions in the said connecting tube and in the connecting tube of the two said vessels, and means adapted to render the level of said indicating liquid in said rising tubes visible from a distance.

10. In a device for indicating speed variations of traveling vehicles, more particularly motor cars, communicating vessels comprising a yoke member located substantially in the direction of the longitudinal axis of the vehicle, rising tubes connected to the ends of said yoke member, an indicating liquid in the said rising tubes, at least one of said rising tubes enlarged in cross-section above the normal level of the indicating liquid, and means adapted to render the level of said indicating liquid in said rising tubes visible from a distance.

11. In a device for indicating speed variations of traveling vehicles, more particularly motor cars, communicating vessels comprising a yoke member located substantially in the direction of the longitudinal axis of the vehicle, rising tubes flattened transversely to the longitudinal axis of the vehicle connected to the ends of said yoke member, an indicating liquid in said rising tubes, and means adapted to render the level of said indicating liquid in said rising tubes visible from a distance.

12. In a device for indicating speed variations of traveling vehicles, more particularly motor cars, communicating vessels comprising a yoke member located substantially in the direction of the longitudinal axis of the vehicle, the central portion of said yoke member contracted and in the operative position located lower than its ends, rising tubes flattened transversely to the longitudinal axis of the vehicle connected to the ends of said yoke member and located in a plane substantially vertical to the longitudinal axis of the vehicle, an indicating liquid in the said rising tubes and in the ends of said yoke member, a propelling mass in the central portion of said yoke member of greater density than the said indicating liquid, the cross-section of the said rising tubes enlarged into a bulb above the normal level of the said indicating liquid, said bulbs of the rising tubes connected with each other in the range above the highest level of the liquid, and means adapted to render the level of said indicating liquid in said rising tubes visible from a distance.

13. In a device for indicating speed variations of traveling vehicles, more particularly motor cars, a box secured to the back of the vehicle, a portion at least of the wall of the box directed rearwardly in operation being transparent, a vessel with communicating parts located in said box, said vessel comprising a yoke member located substantially in the direction of the longitudinal axis of the vehicle, rising tubes connected to the ends of said yoke member, an indicating liquid in said ascending tubes, and means adapted to render the level of said indicating liquid in said rising tubes visible from a distance.

14. In a device for indicating speed variations of traveling vehicles, more particularly motor cars, a box secured to the back of the vehicle, a portion at least of the wall of the box directed rearwardly in operation being transparent, a source of light in said box, a vessel with communicating parts located in said box, said vessel comprising a yoke member located substantially in the direction of the longitudinal axis of the vehicle, rising tubes connected to the ends of said yoke member, at least one rising tube located between said source of light and the said transparent part of the wall of said box, and a light-absorbing indicating liquid in said rising tube.

15. In a device for indicating speed variations of traveling vehicles, more particularly motor cars, a box secured to the back of the vehicle, a portion at least of the wall of said box directed rearwardly in operation being translucent, a source of light located in said box, a vessel with communicating parts located in said box, said vessel comprising a yoke member located substantially in the direction of the longitudinal axis of the vehicle, rising tubes connected to the ends of said yoke member, at least one rising tube located between said source of light and the said translucent part of the wall of said box, at least one color filter located between said source of light and said part of the wall of the box, and a dark indicating liquid in said rising tubes.

16. In a device for indicating speed variations of traveling vehicles, more particularly motor cars, a box secured to the back of the vehicle, a portion at least of the wall of said box directed rearwardly in operation being translucent, a source of light located in said box, at least one translucent, light diffusing screen located between said source of light and said part of the wall of the box, a vessel with communicating parts located in said box comprising a yoke member located substantially in the direction of the longitudinal axis of the vehicle, rising tubes connected to the ends of the said yoke member, at least one rising tube located between said source of light and said translucent part of the wall of the box, and a light absorbing indicating liquid in said rising tubes.

17. In a device for indicating speed variations of traveling vehicles, more particularly motor cars, a box secured to the back of the vehicle, a portion at least of the wall of said box directed rearwardly in operation being translucent, a source of light located in said box, at least one translucent, light diffusing screen located between said source of light and said part of the wall of the box, a vessel with communicating parts located in said box comprising a yoke member located substantially in the direction of the longitudinal axis of the vehicle, rising tubes connected to the ends of the said yoke member and located in a plane substantially vertical to the longitudinal axis, differently colored filters, one filter each located in the path of each beam of light of said source of light passing through a rising pipe, a dark indicating liquid in said rising tubes and in the ends of said yoke member, a propelling liquid of different density than the indicating liquid in the central portion of said yoke member tending to take up a definite central position.

18. In a device for indicating speed variations of traveling vehicles, more particularly motor cars, a box secured to the back of the vehicle in close vicinity to the number plate, at least parts of the box walls in operation directed rearwards and against said number plate being translucent, a source of light in said box, a vessel with communicating parts located in said box, said vessel comprising a yoke member located substantially in the direction of the longitudinal axis of the vehicle, rising tubes connected to the ends of said yoke member, at least one rising tube located between said source of light and the said translucent part of the wall of the box, and a light-absorbing indicating liquid in said rising tube.

19. In a device for indicating speed variations of traveling vehicles, more particularly motor cars, a box secured to the back of the vehicle, a portion at least of the wall of said box directed rearwardly in operation being translucent, a vessel with communicating parts located in said box, said vessel comprising a yoke member located substantially in the direction of the longitudinal axis of the vehicle, rising tubes connected to the ends of said yoke member, a light-absorbing indicating liquid in said rising tubes, and means adapted to catch the daylight and to project it through the said translucent part of the wall of the box, at least one of said rising tubes located in the path of the beam of light to be caught.

20. In a device for indicating speed variations of traveling vehicles, more particularly motor cars, a box secured to the back of the vehicle, a portion at least of the wall of said box directed rearwardly in operation being translucent, a source of light located in said box, a vessel with communicating parts located in said box, said vessel comprising a yoke member located substantially in the direction of the longitudinal axis of the vehicle, rising tubes connected to the ends of said yoke member, at least one rising tube located between said source of light and the said translucent part of the wall of said box, a light-absorbing indicating liquid in said rising tube, a holder mounted in said box, and an at first plastic but subsequently hardening binding medium located between said vessel and said holder.

21. In a device for indicating speed variations of traveling vehicles, more particularly motor cars, a box secured to the back of the vehicle, a portion at least of the wall of said box directed rearwardly in operation being translucent, a source of light located in said box, a vessel with communicating parts located in said box, said vessel comprising a yoke member located substantially in the direction of the longitudinal axis of the vehicle, rising tubes connected to the ends of said yoke member, at least one rising tube located between said source of light and the said translucent part of the wall of said box, a light-absorbing indicating liquid in said rising tube, a light-absorbing layer covering at least the part of the vessel directly struck by the rays of light leaving light passage openings in at least one of said rising tubes.

22. In a device for indicating speed variations of traveling vehicles, more particularly motor cars, a vessel with communicating parts comprising a yoke member located at least approximately in the direction of the longitudinal axis of the vehicle, rising tubes connected to the ends of said yoke member, creosote in said rising tubes, and means adapted to make visible from a distance the level of said creosote in said rising tubes.

23. In a device for indicating speed variations of traveling vehicles, more particularly motor cars, a vessel with communicating parts comprising a yoke member located at least approximately in the direction of the longitudinal axis of the vehicle, the central portion of the said yoke member located at a lower level than its ends, rising tubes connected to the ends of the said yoke member, dark creosote in the said rising tubes and in the ends of the said yoke member, mercury in the central portion of said yoke member, and means adapted to make visible from a distance the level of said creosote in said rising tubes.

In testimony whereof we affix our signatures.

WILHELM GEBHARDT.
PAUL PASCHEN.